2,843,634

METHOD OF ALKYLATING

Carl F. Prutton, Pompano Beach, Fla., assignor to The Lubrizol Corporation, Wickliffe, Ohio, a corporation of Ohio No Drawing. Application March 10, 1954
Serial No. 415,430

7 Claims. (Cl. 260—612)

This invention relates broadly to the process which is usually referred to as "alkylation." That term has been used to describe broadly interaction between different types of organic compounds. The present invention is concerned primarily with a process for effecting interaction between a broad class of halogen-containing organic compounds and different reactive organic compounds. The two materials which are caused to interact by a process of this character are usually referred to as the alkylating material and the material to be alkylated. Broadly, my process relates to methods of effecting interaction between alkylating materials which contain a halogen in the molecule and materials to be alkylated which have a certain chemical structure hereinafter more particularly defined. The process of alkylation wherein the alkylating material is halogen-containing and wherein the material to be alkylated is particularly a ring compound is commonly performed by the well-known Friedel-Crafts type synthesis usually employing a single catalyst such as aluminum chloride or ferric chloride.

The Friedel-Crafts type synthesis, especially when employing aluminum chloride as the catalyst, has a number of undesirable attributes. In the first place, there is a tendency for the alkylating material to become dissociated, especially when the alkylating material is a polymer, in which case such dissociation is in the form of a depolymerization effect. It cannot be over-emphasized that the action of aluminum chloride is quite varied in the products it may cause to be formed because polymerization, isomerization, dealkylation, etc., can occur.

It is a principal object of my invention to provide a method for catalytically effecting interaction between halogen-containing alkylating materials and certain organic compounds, which process has none of the disadvantages of the prior art practices as pointed out above and which further has advantages in that the catalyst materials to be used are inexpensive; they are not consumed in the reaction, the reaction is carried out at low temperature, the yields are unusually high and the entire process is carried out as a simple one-step procedure which reduces to a minimum the cost of operation.

Other objects of the invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, this invention relates to a process of alkylation comprising the step of contacting: (a) a halogenated saturated aliphatic hydrocarbon in which at least one halogen is attached to an aliphatic carbon atom which in turn is bonded to another aliphatic carbon atom; with (b) an oxygen bearing aromatic compound containing at least one substituent which is saturated at the point of attachment to the aromatic ring; said process being carried out at atmospheric pressures, at a temperature between about 70° C. to about 250° C., for about 1 hour to about 6 hours, in the presence of a catalyst consisting essentially of the combination of acid activated clay and zinc chloride the concentration of said zinc chloride being in the range of about 5% to about 50% by weight of said acid activated clay, said process being free from the presence of aluminum chloride and ferric chloride.

In the further and more particular description of my improved method as broadly defined above, it becomes convenient to more particularly treat the reactant materials and the catalysts.

THE ALIPHATIC COMPOUNDS OR ALKYLATING MATERIALS

The alkylating material which is used in my improved process may be any halogenated saturated aliphatic hydrocarbon compound which is capable of being dehydrohalogenated. The alkylating materials useful in my improved method are those halogenated aliphatic compounds in which a halogen atom is attached to an aliphatic carbon atom which is adjacent to another aliphatic carbon atom carrying a hydrogen atom. Specific examples of materials which are useful as the alkylating material are the following:

Compounds derived by halogenating any of the following saturated aliphatic hydrocarbons or by substituting a halogen for any one or more of the hydrogens by halogenation or any other means:

Ethane
Propane
Isopropane
Butane
Isobutanes
Pentanes
Hexanes
Heptanes
Octanes
Nonanes
Decanes
Undecanes
Dodecanes
Tridecanes
Cetanes
Octadecanes
Nonadecanes
Eicosanes
Foots oil
Paraffin waxes
Mineral oil fractions, e. g.: kerosene, gas oil, distillate or "neutral" oils, gasoline, etc.

The halogenated aliphatic compound generally will contain an average of from 2 to 50 carbon atoms, preferably from about 8 to about 30 carbon atoms.

The halogen compounds contemplated are those containing chlorine and bromine, with special preference given to chlorine.

In the foregoing list, the halogen derivatives of the saturated compounds may be prepared by direct chlorination by usual chlorinating procedures, or any other convenient means.

It will be observed that in the broad definition of the usable alkylating materials, these have been defined as capable of dehydrohalogenation. All of the examples given above are of that type. For the purposes of this description and the appended claims, the compound is to be considered as capable of dehydrohalogenation if a substantial amount of the combined halogen may be removed from the compound as hydrogen halide.

THE ORGANIC MATERIALS TO BE ALKYLATED

These materials have been broadly defined as oxygen bearing aromatic compounds which are characterized by the presence therein of at least one tertiary hydrogen atom, and at least one substituent which is saturated at the point of attachment to the aromatic ring. This group of aromatic compounds in which the substituent is saturated at the point of attachment to the ring is more fully discussed in "Organic Chemistry," Fieser and Fieser, D. C. Heath and Company, 1944, on page 558. Included within the scope of such compounds are phenol, diphenyl ether, naphthol, and the alkylated products of such compounds. The substituents may be further designated as ortho or para directing groups.

It will be observed that the aromatic type compounds referred to above all are characterized by the presence therein of at least one tertiary hydrogen atom directly attached to a ring carbon atom. It is to be noted when employing an aromatic type compound as the material to be alkylated that such tertiary hydrogen atom must be of the type which is "replaceable." By that terminology is meant those compounds which contain an "unblocked" hydrogen atom attached to a ring carbon atom, or more specifically, compounds which contain a hydrogen atom on a ring carbon atom and which ring groups, if they carry any other active substituent groups, at least one of the latter is an ortho or para directing group. More desirably, the aromatic type compounds to be alkylated are those which contain a hydrogen atom on a ring carbon atom and contain no meta directing groups.

The broad class of tertiary hydrogen containing organic materials to be alkylated also includes aliphatic materials characterized by the presence of such a hydrogen atom. In such cases it is likewise obvious that the tertiary hydrogen atom at which point alkylation or interaction will occur shall be "unblocked." The presence of substituent groups in the aliphatic molecule which hinder or prevent the aliphatic material from entering into the reaction are excluded from the scope of my invention.

As previously indicated, my improved method has been found useful in effecting interaction between halogen-containing alkylating materials and a wide variety of organic compounds or materials to be alkylated. Specific classes and sub-classes of materials to be alkylated which are useful in my improved process are given in the following table.

Phenols:
  Phenol
  Chlorphenols
  Nitro phenols
  Naphthols (alpha and beta)
  Xylenols
  Cresols
Ethers and thioethers:
  Diphenyl ether
  Phenyl diphenyl ethers
  Diphenyl thioether
  Methoxy benzene
Aromatic esters:
  Phenyl acetate
  Phenyl benzoate
  Phenyl stearate Of the foregoing aromatic compounds, special preference is given to diphenyl ether.

THE CATALYSTS

It will be noted that my improved process comprises the use of a combination of catalysts, the first of which has been broadly defined as an acid activated clay, and the second as zinc chloride. First, with regard to the acid activated clays which may be used, any conventional clay catalyst which has been acid treated for the dual purpose of removing the traces of metal usually found in the naturally occurring clay, and second for the purpose of activating the clay as a surface active material, may be used. The preferred acid employed for the purpose of such activation is sulphuric, also other acids such as phosphoric may be used. An acid activated clay which is commercially available under the trade name "Superfiltrol" has been used and found to be highly satisfactory.

It has been found that the tri-valent metal halides, such as those commonly employed in the Friedel-Crafts synthesis, namely aluminum chloride and ferric chloride, form complexes of a character undesirable for use in my improved process. Because of side reactions, tendency to dealkylate, formation of complex organic materials, increased proportion of tarry residue, and the like, I therefore, exclude aluminum chloride and ferric chloride from the scope of this invention. The spirit of this invention, however, cannot be departed from by employing a preferred metal halide in combination with the acid activated clay, and adding thereto ineffective minor amounts of aluminum or ferric chloride; such minor amounts being ineffective to cause the difficulties commonly associated with these two catalysts, and which are prevalent when such catalysts are employed in a principal amount.

In carrying out my process it will be found that best results will be secured if the organic material to be alkylated and the catalysts are first admixed in a suitable vessel, and the alkylating or aliphatic material then introduced. Since the reaction is exothermic, it is usually best to add the latter material slowly so that there will not be too violent a reaction and too great a rise in temperature. The reaction is carried out at atmospheric pressures. In general, it will be found that while the reaction is exothermic, it will not proceed at a substantial rate until the reactants are heated to a temperature of at least about 70° C. The vessel in which the reaction is carried out may be provided with temperature controlling means. In general, the temperature should not be permitted to rise above about 225° C. during the period of the addition of the alkylating material. At the conclusion of the addition of the alkylating material, the temperature may be elevated for a short period of time on the order of from about 1 to 2 hours to about 250° C. in order to insure completion of the reaction. Thereafter, the desired alkylate may be isolated by any suitable process such as, e. g., decantation, centrifugation, or filtration.

In certain instances, it is desirable to strip the crude alkylate of unreacted starting materials, such stripping operation being performed usually under a slight vacuum and at a temperature sufficient to insure the removal of any unreacted starting materials. Preferably, the stripping operation is carried out on the crude alkylate which has been separated from the catalyst mass.

In general, the chlorinated materials which will be used in alkylating the organic material to be alkylated will have a sufficiently high boiling point to permit reaction temperature within the preferred range of about 70° C. to about 250° C. to be attained. However, when a low boiling halogen containing compound is to be employed as an alkylating material, a slight modification in the procedure should be followed. In such cases the low boiling halogen compound is gradually added to the organic material to be alkylated in either the liquid or the vapor state maintained at the reaction temperature for that particular compound, beneath the surface of the reaction mixture. Such procedure has been successfully carried out with high yields using propyl and butyl chloride as the alkylating material in alkylating high boiling aromatic compounds such as diphenyl ether. Other examples of low boiling halides which may be conveniently employed in this modified procedure include ethyl, amyl and hexyl chlorides, all of which have boiling points below 150° C.

For a further and more specific understanding of the present invention, reference may be had to the folowing examples.

*Example 1*

1700 grams of diphenyl ether, 800 grams of "Superfiltrol" and 160 grams of zinc chloride were mixed in a flask and heated to 170° C. The amount of zinc chloride was 3.5% by weight of the chlorinated paraffin wax (18% Cl content) to be added. 4500 grams of the aforesaid chlorinated paraffin wax were added over a period of 90 minutes. The temperature of the mixture was maintained at 170° C. for one hour after which time it was increased to 240° C. and then filtered with the aid of "Hyflo" filter aid. The filtrate was stripped to 225° C. at 2 mm. Hg absolute pressure. The residue, paraffin wax substituted diphenyl ether, contained only a trace of residual chlorine.

*Example 2*

340 grams (2 moles) of diphenyl ether, 20 grams of zinc chloride and 100 grams of dry "Superfiltrol" were combined in a reaction flask. The mixture was heated up to 180° C. and 710 grams (4 moles) of chlorinated paraffin wax (containing 20% chlorine) were added dropwise over a 60-minute interval. After the addition had been completed, the temperature was maintained at 180° C. for an additional 3 hours until hydrogen chloride evolution had ceased. The amount of hydrogen chloride given off neutralized 150 grams of sodium hydroxide as compared with the theoretical 160 grams of sodium hydroxide. The crude alkylate was filtered hot under vacuum through a canvas pad coated with "Superfiltrol." The filtrate was then stripped under 5 mm. Hg absolute vacuum until the distillation temperature came to 140° C. to remove any unreacted diphenyl ether. The product was then refiltered hot through a second pad coated with "Superfiltrol" to give a clear, oily, greenish, fluorescent liquid. The yield of paraffin wax-substituted diphenyl ether was 79.5%. The product contained a trace of chlorine.

*Example 3*

4080 (24 moles) of diphenyl ether were combined in a reaction flask with 480 grams of "Superfiltrol" and heated to 160° C. 57 grams of zinc chloride were then added and then 2880 grams (16 moles) of monochlor paraffin wax was added dropwise at 160° C. to 180° C. The material was then heated for 2 hours at 210° C. to 220° C. and filtered. The filtrate was stripped to 180° C. vapor temperature at 4 mm. The yield of mono-wax-substituted diphenyl ether was 64%. The product had a slight odor and was a bluish, viscous liquid which contained .29% chlorine and possessed an average molecular weight of about 500.

*Example 4*

445.5 grams of n-octyl chloride (3 moles) were added slowly to an agitated mixture of 170 grams of diphenyl ether, 34 grams of Superfiltrol, and 13.4 grams of ZnCl₂ at 170–180° C. The addition required about 45 minutes. The mixture was then stirred for one hour at 160–175° C. and an additional 2.5 hours at 115° C. The product was filtered and stripped to 125° C. at 5 mm. Hg. Stripping gave about 50% of low boiling materials. The balance consisted of about 8% of mono-octyl diphenyl ether, 25% of di-octyl diphenyl ether, and 15% of tri-octyl diphenyl ether.

*Example 5*

560 grams (6 moles) of phenol, 56 grams of "Superfiltrol" and 60 grams of zinc chloride were placed in a 1-liter, 3-necked flask fitted with a stirrer, reflux condenser, thermometer, and a dropping funnel having a stem reaching to the bottom of the flask. This mixture was heated to 170° C., and 320 grams (3 moles) of amyl chloride (commercial grade; obtained from Sharples Chemical Co.) was introduced beneath the surface of the reaction mixture for a period of 3 hours at 170–180° C. The mixture was filtered and distilled. The first fraction boiling at less than 125° C. at 20 mm. weighed 302 grams and consisted substantially of unreacted phenol. The second fraction, boiling in the range of from 128–146° C. at 20 mm., weighed 235 grams and corresponded to mono-amyl phenol. The third fraction boiling in the range of from 162°–170° C. at 20 mm. weighed 44 grams and corresponded to di-amyl phenol. The residue corresponding to tri- and higher substituted phenols weighed 175 grams. Fraction 2 was a yellow liquid having a phenolic odor. Fraction 3 was a red liquid having a phenolic odor.

*Example 6*

1478 grams of chlorinated acid treated Pennsylvania neutral oil (viscosity: 53 SUS at 210° F.; containing 18% chlorine) 510 grams diphenyl ether, 45 grams of zinc chloride, and 250 grams of Superfiltrol were placed in a 3-liter, 3-necked flask equipped with a stirrer, thermometer, and air condenser. This mixture was heated gradually to 225° C. within 3.5 hours. The product was then filtered and stripped to a vapor pressure of 180° C. at 10 mm. The residue consisting of mineral oil substituted diphenyl ether weighed 915 grams. The product was a clear yellow liquid having no odor and containing a trace of chlorine.

*Example 7*

538 grams of diphenyl ether, 300 grams of Superfiltrol, and 55 grams of zinc chloride were placed in a 3-liter, 3-necked flask equipped with a stirrer, thermometer, dropping funnel, and air condenser. The mixture was heated to 180° C. whereupon 1595 grams of chlorinated white oil containing 21% chlorine were added within a period of 45 minutes. The mixture was heated at 220° C. for a period of 3 hours after which it was filtered and concentrated by heating to a final temperature of 180° C./15 mm. The reddish-brown viscous liquid residue weighed 1080 grams and was shown upon analysis to contain 0.61% chlorine.

Specific combinations of catalysts in addition to the combination of Superfiltrol and zinc chloride as illustrated in the foregoing examples, which have been successfully employed to effect alkylations or interactions of the type herein contemplated are the following:

(1) Superfiltrol+CdCl₂·2½H₂O
(2) Superfiltrol+HgCl₂
(3) Superfiltrol+MgCl₂
(4) Superfiltrol+CoCl₂·6H₂O
(5) Superfiltrol+BeCl₂

There are several distinct advantages which are obtained in the use of my new and improved method of alkylation in addition to those previously mentioned. The product produced according to my method is initially of greater purity than similar products prepared by other methods of alkylation. For example, it has been observed that a reduced amount of tarry material is formed during the reaction. Moreover, I have observed the absence of other side reactions occurring simultaneously with the alkylation such as, for example, splitting of the molecule to form shorter chain or alkyl groups. To illustrate, cetyl chloride may be condensed with an aromatic ether by two different methods of alkylation, notably the common Friedel-Crafts synthesis using aluminum chloride, and secondly the combination of catalysts as described herein. Where aluminum chloride is employed, insignificant amounts of cetyl substituted diphenyl ether may be obtained, the product consisting almost entirely of shorter chain substituent groups which are dissociation products of the cetyl group. In the second case, where the combination of catalysts employed is in accordance with my new improved method of alkylation, with the exception of unreacted materials which may be recovered, substantially all of the alkylated product is cetyl substituted diphenyl ether. The desirability of preventing such side reactions during alkylation is manifest.

I am not certain of the mechanism by which the condensation, or alkylation is effected by the use of the combination of catalytic materials indicated above. One partial explanation may be that the polyvalent metal halide serves to effect a dehydrohalogenation of the halogenated aliphatic compound thereby yielding an unsaturated material which in the presence of the acid activated clay simultaneously condenses with the aromatic nucleus sought to be alkylated.

Another possible explanation is that the alkylation is effected by the direct addition of the aliphatic halide to the aromatic nucleus with the elimination of HCl.

Still another explanation assumes the formation of free radicals which by action of the combined catalyst then readily condense with the aromatic nucleus.

None of these explanations, however, is quite satisfactory since they do not account for the high yield and purity of product produced. For example, neither of the two catalytic materials used in my process is by itself capable of effecting a condensation or alkylation between a halogenated aliphatic compound and an aromatic type compound to any substantial degree. Moreover, it has been found that when the polyvalent metal halide is added first and a dehydrohalogenation reaction performed, and then the acid activated clay is subsequently added, the amount and quality of product obtained by such a sequential means of operation is greatly inferior to that which is obtainable when the catalysts are used in combination. The yield obtained when the two catalysts are present from the beginning of the alkylation has been found in certain instances to be nearly twice that obtainable when the catalysts are added sequentially to the alkylation mass. This unexpected improvement in the obtainable yield of product makes possible the accomplishment of a principal object of the invention as set forth above.

As indicated above, the presence of zinc chloride and the acid activated clay such as "Superfiltrol" from the very start of the process at a temperature of from about 150 to 250° C. results in a higher product yield (70 to 80% of theoretical) than when the catalysts are introduced sequentially. In one case diphenyl ether was successfully alkylated with chlorinated paraffin wax by heating these two materials in the presence of zinc chloride for a period of time and then adding the Superfiltrol and heating for an additional period. The product yield in this case was only 46% of theoretical, and substantial amounts of unsaturated wax and of unreacted diphenyl ether were obtained. When Superfiltrol is first added as the sole catalyst, no alkylation between the chlorinated material and the aromatic material occurs until the polyvalent metal halide is added. It is, therefore, seen that the result obtained by combining the two catalysts at the initiation of the reaction results in a product yield which is nearly twice that obtained from the metallic halide alone, and is, therefore, substantially in excess of the result obtained when either of the two catalytic materials is employed as the sole catalyst for the reaction.

In general, results indicate that alkylation by this process is best effected in the temperature range of from about 70 to 250° C. or preferably from about 150° C. to 250° C. At the lower temperatures, although the alkylation does proceed, the rate of alkylation drops rapidly with a decrease in temperature and at about 70° C. and below, no significant amount of alkylating takes place. It is to be noted that the temperature of 150° C. given as a preferred minimum reaction temperature applies generally to the aromatic compounds which may be conveniently alkylated by my improved method with the exception of that small class of aromatic compounds including benzene, toluene, xylene, ethyl benzene, and the like which have boiling points below 150° C. In these situations, the alkylation may be conveniently carried out at reflux temperatures or at higher temperatures under pressure sufficient to maintain preferably at least one reactant in the liquid phase. However, the major class of aromatic materials which may be alkylated using my improved procedure are all high boiling point materials so that the preferred range of 150° to 250° C. will be employed in most cases.

The time required for such alkylation has been illustrated as being from about 1 hour to 6 or more hours. In general the amount of time required will depend upon:

(a) Temperature of reaction
(b) Nature of halogen attachment in aliphatic material
(c) Concentration of metal halide
(d) Nature of aromatic ring structure But for most purposes, from about 1 hour to about 3 hours has been found adequate. If the halogen is readily hydrolyzable, as in t-butyl chloride, the reaction proceeds rapidly. If it is not readily hydrolyzable as in mono-chlor paraffin wax (as produced in accordance with the teachings of Patent No. 2,218,132), a longer time is required. The concentration of metal halide is generally in the range of from about 5% to about 50% by weight of the activated clay used. The amount of activated clay employed is generally from about 10% to about 60% by weight of the aromatic material employed, the most usual amount being about 30% by weight.

The character of the condensation product will depend upon the following:

(a) The ratio of reactants employed
(b) The catalyst
(c) The temperature
(d) The time For a given combination of catalyst, temperature, and time a high ratio of the aliphatic material to the aromatic compound, within certain limits, will tend to increase the number of aliphatic groups substituted on the aromatic compound nucleus. For example, other conditions remaining constant, a large excess of the aromatic compound (that is, when the molecular ratio of the aliphatic material to the aromatic compound is substantially less than 1:1) the condensation product will consist almost entirely of the mono-substituted aromatic compound; whereas if there is an excess of aliphatic material over the aromatic compound (that is, a molecular ratio substantially higher than 1:1) the average number of substituent groups on the aromatic compound nucleus will be increased so that a substantial amount of poly-substituted aromatic compounds will result. It is to be understood that in the preparation of the condensation product the unreacted starting materials remaining at the end of the reaction period will be removed by distillation (that is by "stripping" or "topping") since the boiling point of such materials will be substantially below that of any condensation products formed.

The effect of the catalyst used, in addition to affecting the rate of reaction, will be somewhat specific in that the nature and relative position of the substituent groups may also be affected as indicated above.

Temperature, also in addition to affecting the rate of reaction, will have an effect on the character of the product in a fashion similar to that effected by different catalysts. For a given initial ratio of reactants, increased temperature will tend to increase the proportion of poly-substituted aromatic compounds.

For a given ratio of reactants and with other conditions remaining constant, increased time will tend to increase the proportion of poly-substituted aromatic compound, especially where a large excess of the aliphatic material over the aromatic compound is used. For example, if a large excess of the aliphatic material is present, the condensation products first formed will contain a relatively high proportion of the mono-substituted aromatic compound but as the length of time is increased the proportion of high substituted aromatic compounds will also increase. Obviously the effect of increasing time is to reduce the amount of unreacted starting materials up until one or the other of such starting materials has been completely converted to a condensation product. Where a large excess of the aliphatic material is used (for example, a ratio of about 6:1 or higher) extending the time of reaction will permit more and more of the aliphatic material to react further with the condensation products first produced thus increasing the degree of alkylation in the final product.

From the foregoing, it will be possible to select a combination of conditions which will produce the desired product for a given use. In general, I prefer a condensation product which will contain an average of from about 1 to about 6 substituent groups per molecule. Such a product may be obtained as indicated above by selecting a ratio of reactants of from about 1 to about 6 moles of the aliphatic material per mole of aromatic compound and continuing the reaction until substantially all of the aliphatic material has been used up. If the reaction conditions selected are such as to leave substantial amounts of the starting materials in unreacted form (for example, by using a large excess of aromatic compound in order to produce a maximum proportion of the mono-substituted product) the amount of recovered unreacted starting materials may be subtracted from those used initially in order to determine the ratio of reactants present in the final product. As indicated above, I prefer products in which the proportions of materials which have actually reacted to form the condensation product are in the ratio of from about 1:1 to about 6:1, expressed as moles of aliphatic material per mole of aromatic compound.

It has been found that products of substantially homogeneous composition can be distilled at reduced pressure from the total reaction mixture, but it is preferred merely to "strip off" any low boiling or unreacted components such as those boiling below about 125° C. at 5 mm. pressure from the reaction mixture. It has been found that by varying the ratios of reaction components as mentioned above, satisfactory products of the required physical properties can be obtained without resorting to costly distillations.

This application is a continuation-in-part of Serial No. 45,570, filed August 21, 1948, now abandoned.

Other modes of applying the principle of the invention may be employed, change being made as regards the details described, provided the features stated in any of the following claims, or the equivalent of such, be employed.

I therefore particularly point out and distinctly claim as my invention:

1. A process of preparing alkylated aromatic compounds which comprises the reaction of (a) a chlorinated saturated aliphatic hydrocarbon with (b) an aromatic compound selected from the class consisting of phenyl ethers, phenyl esters and phenols, said process being carried out at atmospheric pressure, at a temperature within the range of about 70° C. to about 250° C., for a period of time of about one hour to about six hours, in the presence of a catalyst consisting essentially of the combination of acid activated clay and zinc chloride, the concentration of said zinc chloride being within the range of about 5% to about 50% by weight of said acid activated clay, said process being free from the presence of aluminum chloride and ferric chloride.

2. The process of claim 1 characterized further in that the aromatic compound of (b) is a phenyl ether.

3. The process of claim 1 characterized further in that the aromatic compound of (b) is a diphenyl ether.

4. The process of claim 1 characterized further in that the aromatic compound of (b) is phenol.

5. The process of claim 1 characterized further in that the chlorinated saturated aliphatic hydrocarbon of (a) is chlorinated paraffin wax.

6. The process of claim 1 characterized further in that the chlorinated saturated aliphatic hydrocarbon of (a) is a chlorinated paraffin wax and the aromatic compound of (b) is a phenyl ether.

7. A process of alkylation comprising the step of contacting mono-chlor paraffin wax with diphenyl ether at a temperature between 150° C. to about 250° C. for about 1 hour to about 6 hours in the presence of the catalyst consisting essentially of the combination of acid activated clay and zinc chloride, the concentration of said zinc chloride being in the range of about 5% to about 50% by weight of said acid activated clay, said process being free from the presence of aluminum chloride and ferric chloride.

References Cited in the file of this patent

UNITED STATES PATENTS

| | | |
|---|---|---|
| 2,128,109 | Wiezevich | Aug. 23, 1938 |
| 2,170,809 | Coleman et al. | Aug. 29, 1939 |
| 2,387,037 | Otto et al. | Oct. 16, 1945 |
| 2,435,087 | Luten et al. | Jan. 27, 1948 |

OTHER REFERENCES

Major: "Manufacture of Isododecylphenol by I. G. F.," "Fiat Final Report" 1039, March 31, 1947, pages 1 and 2.